(12) United States Patent
Webb et al.

(10) Patent No.: US 8,652,638 B2
(45) Date of Patent: Feb. 18, 2014

(54) THICK THERMAL BARRIER COATING FOR SUPERABRASIVE TOOL

(75) Inventors: Steven W. Webb, Worthington, OH (US); Törbjorn Selinder, Westerville, OH (US)

(73) Assignee: Diamond Innovations, Inc., Worthington, OH (US)

( * ) Notice: Subject to any disclaimer, the term of this patent is extended or adjusted under 35 U.S.C. 154(b) by 591 days.

(21) Appl. No.: 12/716,587

(22) Filed: Mar. 3, 2010

(65) Prior Publication Data

US 2011/0020081 A1 Jan. 27, 2011

Related U.S. Application Data

(60) Provisional application No. 61/156,958, filed on Mar. 3, 2009.

(51) Int. Cl.
*B32B 9/00* (2006.01)
*B23B 27/14* (2006.01)

(52) U.S. Cl.
CPC .......... *B23B 27/148* (2013.01); *B23B 2200/00* (2013.01); *B23B 2226/31* (2013.01); *B23B 2226/12* (2013.01); *B23B 2222/04* (2013.01); *B23B 2224/28* (2013.01); *B23B 2224/36* (2013.01); *B23B 2228/105* (2013.01); *B23B 2222/16* (2013.01); *B23B 2200/08* (2013.01); *B23B 2200/12* (2013.01)
USPC ............... 428/408; 51/307; 51/309; 428/697; 428/698; 428/699; 428/701; 428/702

(58) Field of Classification Search
CPC .............. B23B 27/148; B23B 2200/00; B23B 2200/08; B23B 2200/12; B23B 2224/28; B23B 2224/36; B23B 2226/12; B23B 2226/31; B23B 2228/105; B23B 2222/04; B23B 2222/16
USPC ............ 51/307, 309; 428/408, 697, 698, 699, 428/701, 702, 704
See application file for complete search history.

(56) References Cited

U.S. PATENT DOCUMENTS

| | | | | |
|---|---|---|---|---|
| 4,605,343 A * | 8/1986 | Hibbs et al. | ................... | 407/119 |
| 4,694,918 A * | 9/1987 | Hall | .................. | 51/309 |
| 4,954,139 A | 9/1990 | Cerutti et al. | | |
| 5,193,948 A | 3/1993 | Noggle | | |
| 5,370,195 A * | 12/1994 | Keshavan et al. | ............. | 175/426 |
| 5,395,700 A * | 3/1995 | Nakai et al. | .................... | 75/236 |
| 5,510,193 A | 4/1996 | Cerutti et al. | | |
| 5,853,873 A | 12/1998 | Kukino et al. | | |
| 6,054,185 A | 4/2000 | Inspektor | | |
| 6,090,476 A | 7/2000 | Thysell et al. | | |
| 6,499,547 B2 * | 12/2002 | Scott et al. | .................... | 175/428 |
| 6,599,062 B1 | 7/2003 | Oles et al. | | |
| 6,737,178 B2 * | 5/2004 | Ota et al. | ...................... | 428/698 |
| 6,779,951 B1 | 8/2004 | Vale | | |
| 7,455,918 B2 * | 11/2008 | Gates et al. | .................. | 428/701 |
| 7,998,573 B2 * | 8/2011 | Qian et al. | .................... | 428/408 |
| 2001/0003569 A1 | 6/2001 | Ota et al. | | |
| 2003/0063955 A1 | 4/2003 | De Beaupre et al. | | |
| 2005/0202283 A1 | 9/2005 | Gates | | |
| 2005/0210755 A1 * | 9/2005 | Cho et al. | ........................ | 51/307 |
| 2008/0206576 A1 | 8/2008 | Qian | | |

FOREIGN PATENT DOCUMENTS

| | | |
|---|---|---|
| EP | 1829990 A1 | 9/2007 |
| GB | 2374618 | 10/2002 |
| JP | HO7024606 A | 1/1995 |
| JP | HO7080710 A | 3/1995 |
| JP | H10180508 A | 7/1998 |
| WO | 9828464 A1 | 7/1998 |
| WO | 2006099194 | 9/2006 |
| WO | 2007039955 A1 | 4/2007 |
| WO | 2007/122490 | 11/2007 |

\* cited by examiner

*Primary Examiner* — Archene Turner
(74) *Attorney, Agent, or Firm* — Frank Gao, Esq.

(57) ABSTRACT

The present disclosure relates to cutting tool edges that include on a rake face a superabrasive layer and a HPHT sintered or HPHT bonded cap layer. The cap layer improves adhesion between the superabrasive layer and an optional coating system for the cutting insert and acts as a thick anti-friction layer and/or a thermal barrier coating.

27 Claims, 5 Drawing Sheets

THICK THERMAL BARRIER COATING FOR SUPERABRASIVE TOOL

TECHNICAL FIELD AND INDUSTRIAL APPLICABILITY

The present disclosure relates to cutting inserts. More particularly, the present disclosure relates to a cutting insert that includes on a rake face a superabrasive layer and a cap layer. The cap layer improves adhesion between the superabrasive layer and an optional coating system for the cutting insert and acts as a thick anti-friction layer, and/or a thermal barrier coating.

BACKGROUND OF THE INVENTION

In the discussion of the background that follows, reference is made to certain structures and/or methods. However, the following references should not be construed as an admission that these structures and/or methods constitute prior art. Applicant expressly reserves the right to demonstrate that such structures and/or methods do not qualify as prior art.

Two relevant parts to the function of the edge or tip of a cutting tool include the side or flank face, where metal separation occurs under high pressure, and the top or rake face, where the metal chip flows under low pressure and high shear stress, deforming internally and rubbing against the tool. Chip flow 2 is schematically illustrated in FIG. 1. Due to low pressure at the rake face 4 and finite adhesion chip-to-rake surface, the chip deforms at high strain rate both within the chip and at the rake surface leading to friction heat 6. Under high pressure at the flank face 8, the workpiece acts brittle and separates via cracking with less shear deformation.

On the flank face, friction heat is less than on the rake face. Therefore, on the flank face, wear is mainly by abrasive wear, for example, by hard grits in the metal scratching against the hard flank surface of the tool. On the rake face, wear is mainly by adhesive or thermal-chemical mechanisms including diffusion, alloy formation, and reaction forming new softer phases than the original tool material, or by spalling, chipping and delamination, in which pieces much larger than the grain size of the tool break away.

Flank wear is important since flank wear directly impacts the metal cutting operation. As flank wear proceeds, the tool progressively removes less material. Manual intervention will generally be required to correct the machine path or machined parts of incorrect dimension will be made. This ruins productivity of the machining operation. Thermochemical wear on the rake face is not as critical as it does not affect the quality of the machined parts directly. The rake surface carries the chip away. However, when wear on the rake face proceeds too far, the tip may become geometrically undersupported, bend too much under normal chip forces and break off. As wear on the rake face increases, chip contact increases as does the strain rate within the chip and chip-tool contact area, all of which can accelerate friction heat generation.

One important problem with chip formation and adhesion at the rake face is that friction heat generated there conducts to the flank, where it reduces tool hardness and amplifies abrasive wear. Tool hardness, being derived from compression, is compromised by heat, which produces expansion. When friction heat is sufficiently great, the flank can overheat and suffer thermochemical wear, which can be manifested in features such as gouging, chipping and notching. When this happens, it can be difficult to discern wear pattern differences between the rake and the flank surfaces. Advanced thermochemical wear at the flank can mar the fresh workpiece surfaces, ruining machined part quality, perhaps long before part dimensions are impaired by flank wear or the tool is in jeopardy of breaking. For hard steel turning, surface quality due to flank overheating is typically the most common mode of premature tool life that can waste the advantage of hard and/or superhard tool materials.

Therefore, methods of reducing friction heat and/or reducing the transfer of friction heat from the rake race to the flank face contribute to increased performance of the cutting tool or tool insert.

Overheating is a problem of all tool materials, but particularly a problem with thermally labile, metastable superabrasive tools based on diamond and cubic boron nitride (cBN). The hardness of superabrasive materials is keenly sensitive to temperature.

Friction heat is much worse when cutting soft, non-lubricated metals at high speed with high depth-of-cut (doc) and feed rate. However, the requirement of flank hardness is considerably less than when cutting hard, non-lubricated steels. Friction heat is much reduced by addition of lubricants to the metal.

The general solution to the heat problem for superabrasive tools is to add ceramic to the tool material, improving heat tolerance. However, adding ceramic to superabrasive materials can make the material defective because bonding ceramic to superabrasive materials is not easily accomplished. It is preferred to put ceramic on the rake surface and not in the material of the tool body per se, to allow the ceramic to be effective in carrying away the chip without defecting or reducing the hardness of the superabrasive material itself.

Coatings can act as anti-friction and/or thermal barriers, reducing the production of friction heat and the conduction of friction heat to the flank. Coatings reduce adhesive friction by putting a chip-repelling anti-adhesive material layer between the deforming metal chip and any metal or metal-like component(s) of the tool material. This reduces adhesion as well as internal shear deformation within the chip itself. Coatings may also prevent oxidation of the tool material to softer oxides. Coatings comprising majority covalent ceramics may act as poor heat conductors, reducing heat conduction to the flank.

Coatings are applied as a final step to finish-ground tools and can be placed on all surfaces, including the chamfer 10, the flank 8 and the rake 4 faces, examples of which are shown in FIG. 1. On the flank 8, the coating, typically being softer than the tool material, abrasively wears away quickly exposing the harder and more wear resistant tool material underneath. On the rake 4, the coating abrasively wears slowly due to a lower pressure.

Typically the coating spalls, chips, cracks, delaminates or flakes off due to severe heating, adhesion failure and associated thermochemical wear processes. Typically, once the coating is gone, the rake and flank overheat and fail. The usual manner to improve coating life is to reduce the thickness of the coating and to increase compression on the coating. However, a thin coating has even less wear resistance.

Coatings on cutting tools are normally applied by low pressure gas phase physical vapor deposition (PVD) or chemical vapor deposition (CVD) processes and are limited to <0.020 mm thickness due to increasing stress, grain growth and delamination. Thin coatings limit thermal insulation and wear away faster than thick coatings.

A better coating will be thicker, more inert, non-adhesive to the workpiece, hard (low abrasive wear rate), tough to both mechanical (vibration, impacts) and thermal tensile strains (expand/contract) so as not to crack, and well adhered, both within the bulk of the coating and at the coating interface with the tool material, so as not to delaminate. Achieving all this with conventional PVD and CVD gas phase deposition methods is challenging. PVD cannot make thick coatings effectively. Due to low PVD temperatures, the grains within the PVD films are not well developed, and thus are of lower hardness and bonding strength. CVD coatings produced up to 1000° C. are better crystallized than PVD. However, CVD coatings >0.020 mm thick are generally not successful and generally cause tool embrittlement.

SUMMARY OF THE INVENTION

Bonding a ceramic PVD or CVD film to a tool material, particularly a superabrasive tool material, is often a big challenge. The two materials, ceramic and superabrasive, simply do not adhere well to survive thermal and bend strains in tool manufacture and use regardless of thickness or coating temperature. Thus, it would be advantageous to have a tool including such a bonded ceramic layer and a method to produce such a bonded ceramic layer.

A thick, greater than 0.02 mm cap layer on a rake face of a superabrasive layer of a cutting tool is made by high pressure/high temperature (HPHT) co-sintering of a fine-grained ceramic or cermet powder or ceramic or HPHT diffusion-bonding of a cermet wafer, disk or compact, in contact with a superabrasive powder compact. HPHT co-sintering or bonding of the ceramic and/or cermet layer limits grain growth during sintering and allows higher-temperature bonding to the superabrasive layer, thus making a better ceramic or cermet material and an excellent bond.

The thickness of the cap layer can include the tool chamfer height, if a chamfer is present, but preferably does not include any part of the tool flank face. A minimum coating thickness is set by the design of the tool and cutting condition, not by a coating process limitation. The cutting insert may include an optional additional PVD or CVD coating system applied over the cap layer on the rake face and to the flank face of the superabrasive layer and underlying substrate. The cap layer acts as a "primer" layer, optimally sintered (for powders) or bonded (for solids) to the superabrasive layer at HPHT conditions that also allows improved adhesion of PVD and CVD coatings to the superabrasive tool. Indeed, the cap layer may be selected because it sinters (for powders) or bonds (for solids) to superabrasive and PVD/CVD coatings as well. Additionally, the thick cap layer can function as a thermal insulator, inhibiting friction heat flow to the flank. Finally, the cap layer may itself form a durable, thick, anti-friction coating on the superabrasive tool.

An exemplary cutting insert comprises a superabrasive layer on a rake face of the cutting insert, and a cap layer high pressure/high temperature (HPHT) sintered or high pressure/high temperature (HPHT) bonded to the superabrasive layer on the rake face, wherein the cap layer includes one or more layers each having a composition including a cermet, a ceramic or a metal, and wherein a thickness of the cap layer is about 20 µm or thicker.

Another exemplary embodiment of a cutting insert comprises a rake face and an opposing base surface, and a plurality of flank faces interconnect the rake face and the base surface, wherein an intersection of the plurality of flank faces and the rake face form a cutting edge, wherein the rake face of the cutting insert includes the following, in order from an outermost surface inward to a substrate: a coating system, a cap layer, a superabrasive layer, and the substrate, wherein the cap layer has a composition including a cermet, a ceramic or a metal, and wherein a thickness of the cap layer is about 20 µm to about 200 µm.

An exemplary method of manufacturing a cutting insert comprises bonding a cap layer to a surface of a superabrasive layer of a substrate structure by a high pressure/high temperature (HPHT) process, shaping the substrate structure with the bonded cap layer to a shape of a cutting insert, and coating a rake face and a flank face of the cutting insert with a coating system, the coating system including at least one ceramic layer, wherein the cap layer has a composition including a cermet, a ceramic or a metal, and wherein a thickness of the cap layer is about 20 µm to about 200 µm.

It is to be understood that both the foregoing general description and the following detailed description are exemplary and explanatory and are intended to provide further explanation of the invention as claimed.

BRIEF DESCRIPTION OF THE DRAWINGS

The following detailed description can be read in connection with the accompanying drawings in which like numerals designate like elements and in which.

DETAILED DESCRIPTION OF EXEMPLARY EMBODIMENTS

Figure 1:
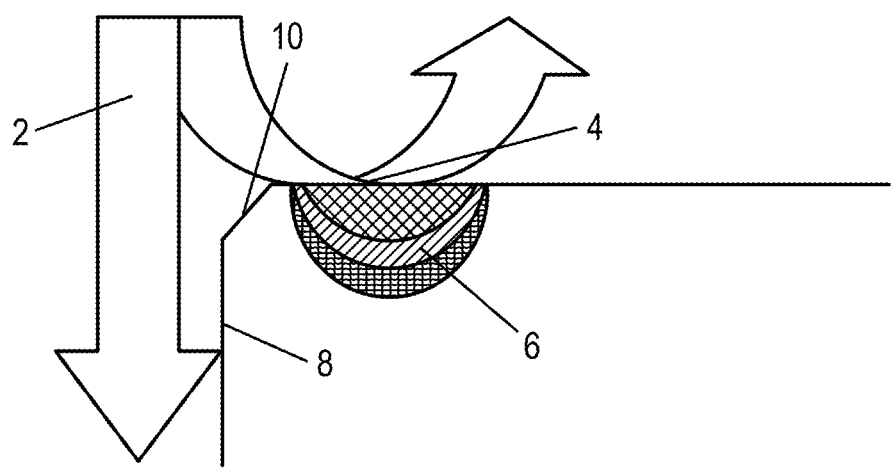
FIG. 1 is a schematic illustration of chip flow and heating phenomena during cutting operations.
Figure 2:
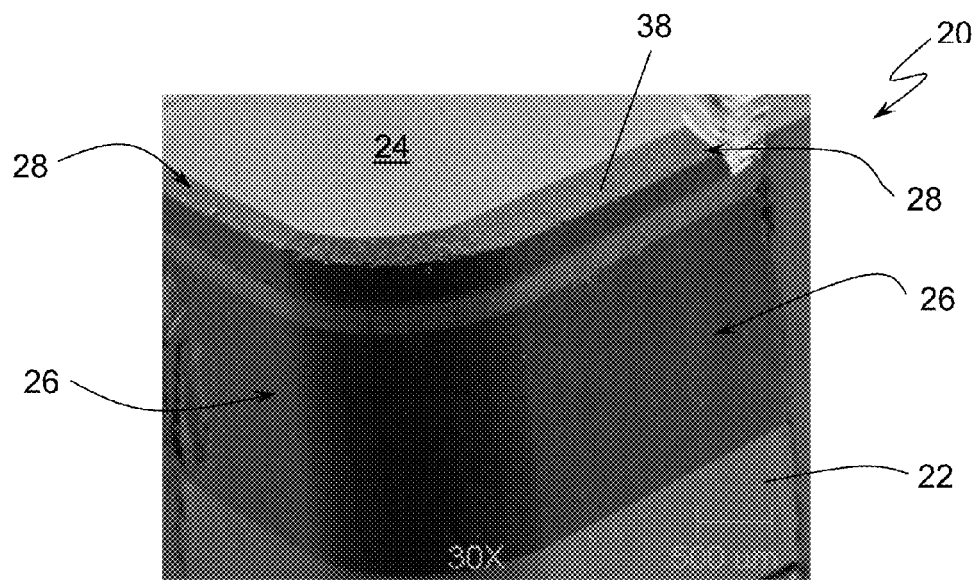
FIG. 2 is a micrograph of a perspective view of an exemplary embodiment of a cutting insert.

FIG. 2 is a micrograph of a perspective view of an exemplary embodiment of a cutting insert showing some of the general features of the disclosed cutting insert. The exemplary embodiment of the cutting insert 20 includes a support body 22, such as a WC—Co body, including a rake face 24, a base surface (not shown) and a plurality of flank faces 26 interconnecting the rake face 24 and the base surface. An intersection of the plurality of flank faces 26 and the rake face 24 forms a cutting edge 28. The FIG. 2 embodiment is shown with a support body 22, but an unsupported structure including a superabrasive layer as a rake face of the cutting insert and a cap layer sintered or bonded to the superabrasive layer on the rake face is also contemplated. Such an unsupported structure can subsequently be provided with a support body and/or a coating system.

Figure 3:
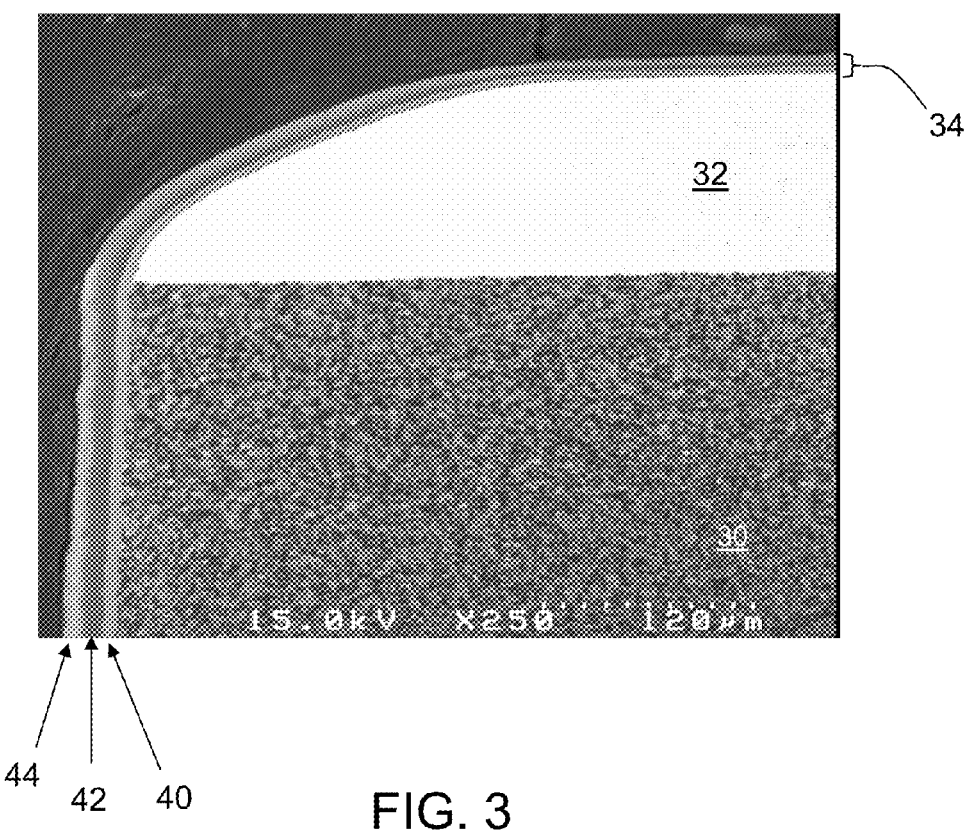
FIG. 3 is a micrograph of a cross-section of an exemplary embodiment of the cutting insert illustrating various positions of different layers in the cutting insert.

FIG. 3 is a micrograph of a cross-section of an exemplary embodiment of a cutting insert illustrating the various positions of different layers in the cutting insert 20. A superabrasive layer 30 is positioned on the rake face of the support body 22 (not shown). A cap layer 32 is bonded to the superabrasive layer 30, followed by a coating system 34. The coating system 34 is on the rake face 24 and the flank faces 26 of the cutting insert 20. Thus, in cross-section the rake face of the cutting insert includes the following, in order from an outermost surface 36 inward to the substrate 22: a coating system 34, a cap layer 32, a superabrasive layer 30, and the substrate 22.

The cutting insert can optionally include a chamfer 38 as shown in FIG. 2. When the cutting insert includes a chamfer, the thickness of the cap layer may be equal to or less than a height of the chamfer so that, optimally, the cap layer does not participate in metal cutting at the flank surface. The height of the chamfer is measured perpendicularly from the plane containing the rake face to the intersection of the chamfer and the flank face. The chamfer is intended to strengthen the tool so that it does not bend and break under chip forces prior to tool wear.

The cap layer has a composition including multiple or singular cermet, ceramic, or metal layer(s). Examples of each of these compositions include, for cermets: WC/Co or TiCN/Co; for ceramics: a nitride, a boride, a carbide or an oxide, for example alumina, AlN, or $ZrO_2$; and for metal Ta, Nb, Mo, or refractory metals. The cap layer itself has a thickness of about 20 μm or thicker, although the thickness can be greater or lesser at the cutting edge to accommodate optional chamfering or the edge effect of the cap layer. In alternative embodiments, the thickness of the cap layer is about 30 μm to about 200 μm, alternatively less than about 150 μm. At higher thickness and depending on the geometry of the cutting insert, the cap layer can non-optimally become part of the flank face. While a small amount can be tolerated, it is generally not desirable for the cap layer to become part of the flank face because the cap layer will typically be softer than the tool material, resulting in decreased cutting efficiency by extending the break-in period of the tool as the softer material at the flank is worn away.

The cap layer formed at HPHT conditions acts as a primer layer for additional coating layers, whether such additional coating layers are applied at HPHT conditions or not. These additional coating layers can function as a thermal barrier and/or an anti-friction coating layer. The concept of a primer layer connotes the function of the cap layer as promoting adhesion and other improved performance between the surface underlying the cap layer and any layers overlying the cap layer. This is important for cutting tool materials on which thin ceramic films do not adhere well, when deposited via PVD or CVD methods. Those materials include superabrasive materials.

The coating system 34 includes one or more layers including at least one layer of a ceramic. Examples of the composition of the at least one ceramic layer include a titanium-based carbide or nitride layer, such as TiN, TiC, TiCN, TiSiN, SiN, alumina, AlN, $ZrO_2$, ZrN, chromia and combinations and/or alloys thereof. In the illustrated embodiment, the coating system is a multilayer including an innermost TiCN ceramic layer 40, an intermediate aluminum oxide layer 42, and an outermost TiN layer 44. Both multilayer and single layer coating systems can be utilized. The coating system is generally conformal across the transition from the rake face 24 to the flank face 26.

Materials for the compositions of coatings are chosen based on their performance properties vis-à-vis metal cutting operations. Thus and for example, TiAlN is a better coating for heavy interruption, cooler turning, and this coating sticks well to the substrate and is ductile if not lubricious (via TiN). However, TiN sticks to steel being much more metallic than AlN or $Al_2O_3$. $Al_2O_3$ is an anti-friction coating for hot continuous turning. However, it is brittle and necessarily thin, laminated with bonding TiCN layers. In interrupted cutting, alumina can delaminate. Thick AlN may be a useful intermediate coating; less metallic than TiN, lower-friction, but not as brittle as alumina.

The superabrasive layer 30 has a composition including polycrystalline boron nitride (PCBN) or polycrystalline diamond (PCD).

An exemplary method of forming the disclosed cutting insert includes high pressure/high temperature (HPHT) processing, i.e., processing at 50-60 kbar, at 1200° C. to 1600° C. for 5 to 20 minutes, to bond a 30 μm to 200 μm thick cap system having a composition including a cermet, a ceramic or a metallic layer to a superabrasive layer. After shaping processes, e.g., grinding, cutting, etc., a coating system including at least one ceramic layer is deposited. Details regarding HPHT processing are disclosed in U.S. Pat. No. 4,954,139, the entire contents of which are incorporated herein by reference. HPHT processing results in a cap layer that is sintered (if using powdered starting materials) or bonded (if using solid starting materials) with a resulting isotropic, fine-grained structure that allows thicker coating with less stress, improved adhesion and higher heat tolerance for the material. As an example and in contrast, CVD typically produces a columnar-grained structure.

In the above exemplary method, the process sinters and bonds the support body, superabrasive layer and cap layer in a single process. In an alternative method, the cap layer can be formed separate from the underlying support body and superabrasive layer and can be bonded/applied in a separate process that may or may not include HPHT conditions.

Several exemplary methods can be used to attach the cap layer to the superabrasive. These methods include free powder sintering, metal bonding foil, metal bonding foil also suitable as a container for HPHT sintering, and WC/Co cermet HPHT. Of these example methods, WC/Co cermet HPHT processing was considered to achieve the most desirable results for cutting insert applications.

EXAMPLE 1

3 grams of preblended powder (25/75 weight percent (w/w) 2 μm TiC and <1 μm $Al_2O_3$) was added to the bottom of a Ta metal sinter container cup. On top was added 14 grams of preblended powder comprising 50 w/w 1 μm TiN, 41 w/w 2 μm cBN, 5 w/w 2 μm $NiAl_3$ and 4 w/w submicron WC powder. This powder can be considered a low cBN content PCBN formulation appropriate for machining hardened alloy steels (HRC>30). Both powder blends were leveled and compacted separately. On top of the cBN powder was placed a solid sintered tungsten carbide disk between 0.05 and 0.3" (1.27 mm to 7.62 mm). The Ta cup containing the layer powders and carbide disk was crimped and placed in an HPHT cell and sintered for 20 minutes at 1450° C. and 55 kbar. The resulting sintered material was ground on all sides to remove container material and create flat surfaces for inspection and tool fabrication. The sintered blank had 2 surface cracks but was otherwise well adhered. Small triangles were formed by wire electronic discharge machining (WEDM) from the ground tool blank.

Figure 4:
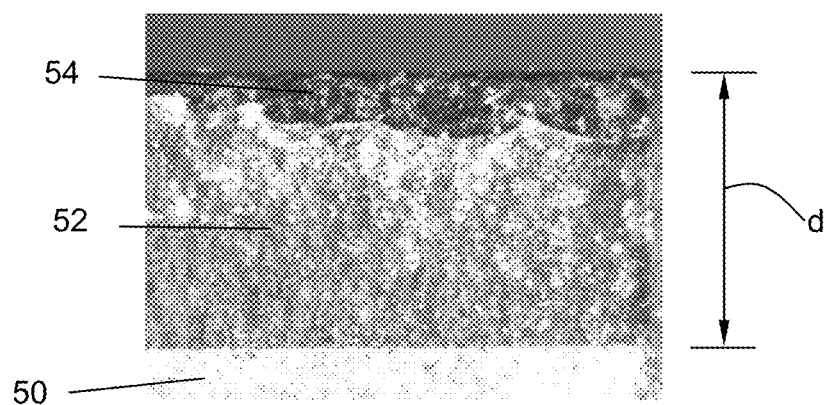
FIG. 4 is an optical photograph showing a support body, a superabrasive layer and a ceramic cap layer.

A section of a sample from Example 1 is shown in the optical photograph of FIG. 4. In FIG. 4, the WC—Co support body 50 and the sintered superabrasive layer 52 are visible. A ceramic layer 54 is also shown. In this example, the ceramic layer 54 is shown as a darker, top layer and is the TiC/alumina HPHT-sintered ceramic HPHT-sinter-bonded with no visible delamination to the superabrasive layer 52. Here, the superabrasive layer 52 is a polycrystalline boron nitride (PCBN) layer. Below the superabrasive layer 52 is a region of sintered tungsten carbide, which is the support body 50, shown as white in the optical photograph. The ceramic layer 54 is 0.05 mm to 0.26 mm thick (average 0.17 mm thick). For reference, the distance (d) from the surface of the ceramic layer 54 to the interface of the superabrasive layer 52 and the support body 50 is 1.08 mm long.

The triangle formed by the method of Example 1 was brazed to a standard carbide insert tool holder and ground to form a CNGA432 type tool insert for metal cutting, with 0.005–0.008"×25 deg chamfer. In this case, the ceramic cap layer comprised the entire chamfer. The TiC/alumina capped PCBN inserts were tested in cast iron at 1200 surface feet per minute (sfpm), 0.040" (1.016 mm) depth of cut (doc) and a feed rate of 0.010" inches per revolution (ipr). The insert chipped out due to poor adhesion of the ceramic cap layer to the PCBN. This poor adhesion is believed to be a result of the non-uniform cap thickness due to the use of ceramic powders.

EXAMPLE 2

Presintered, ground, dense and hard alumina (0.77 mm thick) and AlN (0.8 mm thick) wafers were placed outside the Ta cup containing superabrasive powder as per Example 1. The two systems were HPHT-sintered as per Example 1. The ceramic wafers, alumina and AlN were in this way bonded to the superabrasive disk with the Ta container layer between the superabrasive material and the ceramic cap. The alumina cap layer was much less cracked and appeared better bonded and harder (in grit blast) than the AlN cap. The ceramic cap layer exhibited better quality than that obtained from free powder. However, tools fabricated from this capped PCBN material failed immediately likely due to the presence of the container metal interface layer increasing chip adhesion and friction heat. This metal layer should be reduced when practical.

EXAMPLE 3

The system of Example 2 was redone with the same alumina disk inside the Ta cup with, in one blank, a 0.025 mm Ti wafer, and, in another blank, a 0.05 mm Nb foil, to help bond ceramic disk to PCBN. After HPHT processing, the alumina-capped blanks were ground to reveal Nb and Ti metal interfaces and quality of the ceramic cap layer. The ceramic layers were crack-free with 2-3 spots of delamination.

EXAMPLE 4

Replacing the metal interlayer with a ceramic film was attempted. A 0.005 mm CVD TiN coating was applied to the same alumina wafer. It was hypothesized that TiN would bond to alumina and PCBN, thus acting as a metal-free interlayer between ceramic cap and PCBN. The alumina/TiN cap was indeed well bonded to the PCBN, but the interface was too brittle for tool fabrication.

EXAMPLE 5

Rather than a discrete metal or ceramic interface layer, it was proposed to use a cermet cap instead of a ceramic cap material. A cermet typically contains a small amount of metal thus is not optimal as an anti-friction or thermal-barrier layer, but may bond easier to PCBN at HPHT and is more ductile. A subsequent PVC or CVD ceramic film on top of the cermet cap may be used to reduce adhesive friction.

A cermet disk (0.023") comprising sintered WC/Co, 14 w/w and 2 μm grain size was used as a cap layer for the PCBN as in Example 1. The sintered WC/Co bonded well with PCBN and formed a crack-free cap layer. The carbide-capped PCBN material was cut, brazed and ground to form a standard cutting tool insert. The insert was then CVD coated with a multilayer ceramic coating identical to FIG. 3.

Cutting insert samples were prepared and tested in machining of hard steel in two test configurations. Test 1 is a continuous facing test, in which there is no interruptions to allow friction heat to dissipate. This is a "hot" test designed to observe friction heat and its affect on tool flank wear. Test 2 is an interrupted test designed to test toughness of the tool material system, including cap and/or coating, from repeated impact of increasing impact strength via increasing feed and depth-of-cut until complete tool breakage.

| Test 1: Facing Test-52100 Steel (case hardened) | |
| --- | --- |
| Speed (sfm): | 508 |
| Feed Rate (ipr): | 0.003 |
| Depth of cut (doc): | 0.010" |
| insert style: | CNGA-432 |
| Chamfer: | 0.004" at 30° |

Figure 5:
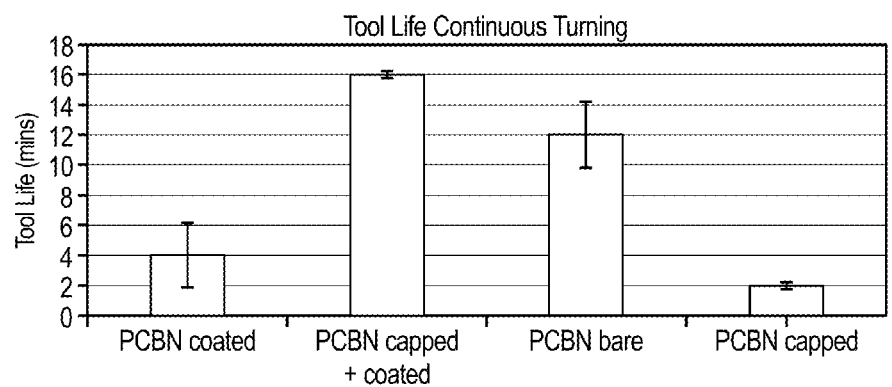
FIG. 5 presents results for tool life for continuous machining.

Results for Test 1 are shown in FIG. 5 for inserts produced from Example 5, where end of life is defined as minutes in the cut to reach 0.008" flank wear. The inserts were bare PCBN, coated PCBN, capped PCBN and capped and coated PCBN.

The CVD coated PCBN insert showed poor wear life compared to the bare PCBN. It is believed that the ceramic film adhered poorly to PCBN. However, with the same CVD coating (FIG. 3) on top of the cap layer, PCBN tool life surprisingly increases significantly. This is attributed to improved adhesion of the coating to carbide, good adhesion of carbide to PCBN, and the function of the coating to reduce friction heat. The carbide cap alone, with no ceramic coating performed worst in Test 1. Carbide is not as good a material to carry away a hard steel chip.

| Test 2: Interrupted Facing Test-8620 Steel (case hardened) | |
| --- | --- |
| Speed (sfm): | 656 |
| Feed Rate (ipr): | starting at 0.003 and increasing at 0.0008" per pass until failure |
| Depth of cut (doc): | increasing, equal to feed rate |
| insert style: | CNGA-432 |
| Chamfer: | 0.004" at 30° |

Figure 6:
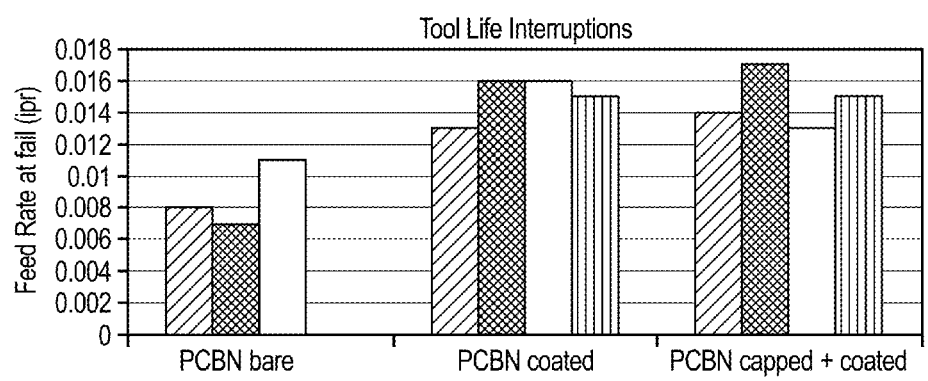
FIG. 6 presents results for tool life for interrupted machining.

Interruption is from a small notch in a 8620 steel disk. Results for Test 2 are shown in FIG. 6 for three inserts produced from Example 5, where end of life tool failure is defined as the maximum feed rate before the tool fractures. The graph in FIG. 6 shows that the coating is weak in tension and spalls quickly. The same coating on a cap layer bonded to PCBN is as tough as the same grade of uncoated PCBN. The results show essentially no impairment when a cap as disclosed herein is included as compared to a sample without a cap.

EXAMPLE 6

A further test was performed on inserts with the same carbide cap layer as in Example 5, but without any further coating layers, in soft steel machining, i.e., capped and uncoated. The carbide cap is intended to act as a thick, refractory coating for PCBN that may address the increased friction heat confronted by bare PCBN machining soft steel. The carbide cap thickness varied between 0.002" and 0.007". Three CNGA-432 style inserts were tested: (A) uncoated carbide with a conventional chipbreaker (B) carbide capped PCBN with a chamfer, and (C) carbide capped PCBN without a chamfer. Both PCBN inserts utilized a clamped shim to act as a chipbreaker. The PCBN grade was the same as that of Example 1. Low carbon steel (1018) cylinder was OD turned without coolant. The machining parameters used were:

| | |
|---|---|
| Depth of cut (doc): | 0.010" |
| Speed (sfpm): | 1200 |
| Feed Rate (ipr): | 0.007" |
| # of Passes: | 5, each 9" long |

The carbide capped PCBN insert with a chamfer (Sample B) showed 0.003" flank wear compared to 0.018" on the standard carbide (Sample A). Wear was accelerated due to high friction heat from the soft steel chip and no coolant. The PCBN insert without a chamfer (Sample C) chipped.

Figure 7A:
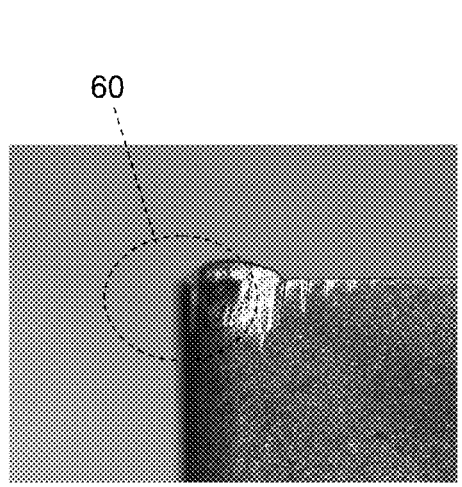
FIGS. 7A and 7B are photographs of a carbide insert (FIG. 7A) and a capped, superabrasive insert (FIG. 7B) after machining soft steel.
Figure 7B:
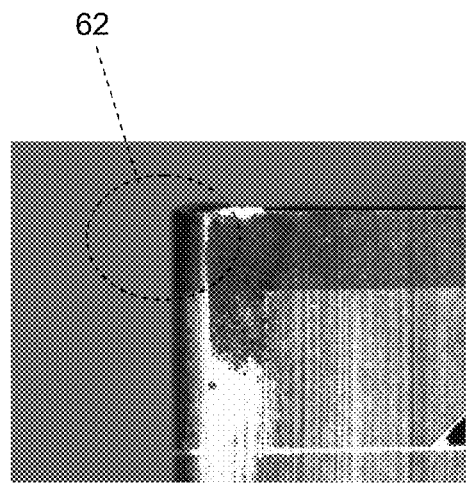

All inserts exhibited "welding" or build-up of adhered soft steel due to excessive friction heat from lack of coolant. The chip curl, thickness, and width were similar on each insert due to using the same chip breaker. FIGS. 7A and 7B are photographs of brazed Sample B (FIG. 7A) and a standard carbide Sample A (FIG. 7B). The standard carbide Sample A has a region 60 of greater flank wear than a region 62 of flank wear on the carbide capped PCBN (Sample B) and a much larger adhered layer of steel due to the larger wear on the rake face (not shown) and concomitant higher heat. Wear patterns on FIG. 7A are visibly pronounced as compared to FIG. 7B.

Although described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A cutting insert, comprising:
   a superabrasive layer on a rake face of the cutting insert, wherein the cutting element comprises a plurality of flank faces interconnect the rake face; and
   a cap layer high pressure / high temperature (HPHT) sintered or high pressure / high temperature (HPHT) bonded to the superabrasive layer on the rake face;
   wherein the cap layer includes one or more layers each having a composition including a cermet, a ceramic or a metal, wherein the cap layer is not disposed on the plurality of flank faces of the cutting insert; and
   wherein a thickness of the cap layer is about 20 µm or thicker.

2. The cutting insert according to claim 1, comprising a support body, wherein the superabrasive layer is sintered to a first surface of the support body.

3. The cutting insert according to claim 1, comprising a coating system deposited onto the cap layer on the rake face and onto a flank face of the cutting insert.

4. The cutting insert according to claim 1, wherein the superabrasive layer has a composition including polycrystalline boron nitride (PCBN) or polycrystalline diamond (PCD).

5. The cutting insert according to claim 1, wherein the thickness of the cap layer is about 30 µm to about 200 µm.

6. The cutting insert according to claim 5, wherein the thickness of the cap layer is less than about 150 µm.

7. The cutting insert according to claim 1, wherein the cermet includes WC/Co or TiCN/Co and has a metal content of 0.5 w/w to 25 w/w.

8. The cutting insert according to claim 1, wherein the ceramic includes a nitride, boride, carbide or an oxide.

9. The cutting insert according to claim 8, wherein the ceramic is alumina, AlN, or $ZrO_2$.

10. The cutting insert according to claim 1, wherein the metal includes Ta, Nb, Mo, or refractory metals.

11. The cutting insert according to claim 3, wherein the coating system includes at least one ceramic layer.

12. The cutting insert according to claim 11, wherein the at least one ceramic layer has a composition including TiN, TiC, TiCN, TiSiN, SiN, alumina, AlN, $ZrO_2$, ZrN, chromia and combinations and/or alloys thereof.

13. The cutting insert according to claim 1, wherein the cutting insert includes a chamfer and wherein the thickness of the cap layer is equal to or less than a height of the chamfer.

14. A cutting insert, comprising:
    a rake face and an opposing base surface; and
    a plurality of flank faces interconnect the rake face and the base surface,
    wherein an intersection of the plurality of flank faces and the rake face form a cutting edge,
    wherein the rake face of the cutting insert includes the following, in order from an outermost surface inward to a substrate: a coating system, a cap layer, a superabrasive layer, and the substrate, wherein the plurality of flank faces comprise no cap layer,
    wherein the cap layer has a composition including a cermet, and
    wherein a thickness of the cap layer is about 20 µm to about 200 µm.

15. The cutting insert according to claim 14, wherein the cap layer is HPHT sintered or HPHT bonded to the superabrasive layer and the superabrasive layer is sintered to the substrate.

16. The cutting insert according to claim 14, wherein at least one of the flank faces of the cutting insert includes the following, in order from an outermost surface inward: the coating system.

17. The cutting insert according to claim 14, wherein the coating system includes at least one ceramic layer having a composition including a nitride, boride, carbide or an oxide.

18. A cutting insert, comprising:
    a superabrasive layer on a rake face of the cutting insert, wherein the cutting element comprises a plurality of flank faces interconnect the rake face; and
    a cap layer high pressure / high temperature (HPHT) sintered or high pressure / high temperature (HPHT) bonded to the superabrasive layer on the rake face;
    wherein the cap layer includes one or more layers each having a composition including a cermet a ceramic or a metal, wherein the cap layer is not disposed on the plurality of flank faces of the cutting insert, further comprising a coating system deposited onto the cap layer on the rake face and onto a flank face of the cutting insert and
    wherein a thickness of the cap layer is about 20 µm or thicker.

19. The cutting insert according to claim 18, comprising a support body, wherein the superabrasive layer is sintered to a first surface of the support body.

20. The cutting insert according to claim 18, wherein the superabrasive layer has a composition including polycrystalline boron nitride (PCBN) or polycrystalline diamond (PCD).

21. The cutting insert according to claim 18, wherein the thickness of the cap layer is about 30 µm to about 200 µm.

22. The cutting insert according to claim 21, wherein the thickness of the cap layer is less than about 150 µm.

23. A superabrasive tool, comprising:
a superabrasive layer on a first face of the cutting insert, wherein the cutting element comprises a second face interconnecting the rake face; and
a cap layer high pressure / high temperature (HPHT) sintered or high pressure / high temperature (HPHT) bonded to the superabrasive layer on the face;
wherein the cap layer includes one or more layers each having a composition including a cermet, a ceramic or a metal, wherein the cap layer is not disposed on the face of the cutting insert; and
wherein a thickness of the cap layer is about 20 μm or thicker.

24. The tool according to claim 23, comprising a support body, wherein the superabrasive layer is sintered to a first surface of the support body.

25. The tool according to claim 23, comprising a coating system deposited onto the cap layer.

26. The method according to claim 25, wherein the coating system includes at least one ceramic layer having a composition including a nitride, boride, carbide or an oxide.

27. The method according to claim 26, wherein the at least one ceramic layer has a composition including TiN, TiC, TiCN, TiSiN, SiN, alumina, AlN, $ZrO_2$, ZrN, chromia and combinations and/or alloys thereof.

* * * * *